United States Patent [19]

Ziebol et al.

[11] Patent Number: 5,159,655

[45] Date of Patent: Oct. 27, 1992

[54] OPTICAL FIBER CRIMP

[75] Inventors: Robert J. Ziebol, Blaine; Harold A. Roberts, Eden Prairie, both of Minn.

[73] Assignee: ADC Telecommunications, Inc., Minneapolis, Minn.

[21] Appl. No.: 648,491

[22] Filed: Jan. 31, 1991

[51] Int. Cl.[5] .................................. G02B 6/36
[52] U.S. Cl. ..................................... 385/81; 385/136
[58] Field of Search ............... 350/96.20, 96.21, 96.22; 385/81, 83, 84, 136, 137

[56] References Cited

U.S. PATENT DOCUMENTS

| | | | |
|---|---|---|---|
| 3,705,756 | 12/1972 | Keller et al. | 350/96.20 |
| 3,734,594 | 5/1973 | Trambarulo | 350/96.21 |
| 3,880,452 | 4/1975 | Fields | 350/96.21 |
| 4,080,044 | 3/1978 | Gousseau | 350/96.15 |
| 4,159,900 | 7/1979 | Elden | 65/4 B |
| 4,184,741 | 1/1980 | Hawk et al. | 350/96.20 |
| 4,193,665 | 3/1980 | Arnold | 350/96.22 |
| 4,232,934 | 11/1980 | Feinbloom | 350/96.20 |
| 4,268,115 | 5/1981 | Slemon et al. | 350/96.21 |
| 4,319,802 | 3/1982 | Bowes | 350/96.20 |
| 4,370,022 | 1/1983 | Johnson | 350/96.21 |
| 4,390,237 | 6/1983 | Marazzi | 350/96.20 |
| 4,406,515 | 9/1983 | Roberts | 350/96.21 |
| 4,422,716 | 12/1983 | Morimoto et al. | 350/96.21 |
| 4,447,121 | 5/1984 | Cooper et al. | 350/96.20 |
| 4,487,474 | 12/1984 | Nishie et al. | 350/96.21 |
| 4,541,685 | 9/1985 | Anderson et al. | 350/96.21 |
| 4,545,644 | 10/1985 | DeVeau, Jr. et al. | 350/96.21 |
| 4,615,581 | 10/1986 | Morimoto | 350/96.21 |
| 4,648,688 | 3/1987 | Ashman et al. | 350/96.20 |
| 4,684,205 | 8/1987 | Margolin et al. | 350/96.21 |
| 4,691,985 | 9/1987 | Shank et al. | 350/96.18 |
| 4,691,986 | 9/1987 | Aberson, Jr. et al. | 350/96.21 |
| 4,695,126 | 9/1987 | Cook | 350/96.21 |
| 4,711,518 | 12/1987 | Shank et al. | 350/96.20 |
| 4,822,131 | 4/1989 | Anderton | 350/96.21 |
| 4,832,440 | 5/1989 | Anderton | 350/96.21 |
| 4,850,670 | 7/1989 | Mathis et al. | 350/96.21 |
| 4,953,941 | 9/1990 | Takahashi | 350/96.20 |
| 5,011,258 | 4/1991 | Takeda | 350/96.20 |

FOREIGN PATENT DOCUMENTS

3112000A1 7/1982 Fed. Rep. of Germany .

OTHER PUBLICATIONS

"UV-Curable Adhesive Bonds Optical Fiber to Connector", *Design News* Dec. 6, 1982, pp. 60-61.

*Primary Examiner*—Frank Gonzalez
*Attorney, Agent, or Firm*—Merchant, Gould, Smith, Edell, Welter, & Schmidt

[57] ABSTRACT

In an optical fiber connector subassembly, a ferrule is received within a hollow cylindrical crimp. The ferrule has a bore extending through the ferrule with a longitudinal slot formed within the ferrule exposing a portion of the bore. The crimp is provided with first and second crimping portions. The first crimping portion extends into the slot and opposes the ferrule bore. The second crimping portion is diametrically opposed to the first crimping portion and opposes an exterior surface of the ferrule. Application of a force to the sides of the crimp causes the first and second crimping portions to be spaced apart a distance sufficient to insert a fiber within the ferrule bore. Release of the force causes the first and second crimping portions to be biased toward one another to securely crimp the fiber within the ferrule.

9 Claims, 3 Drawing Sheets

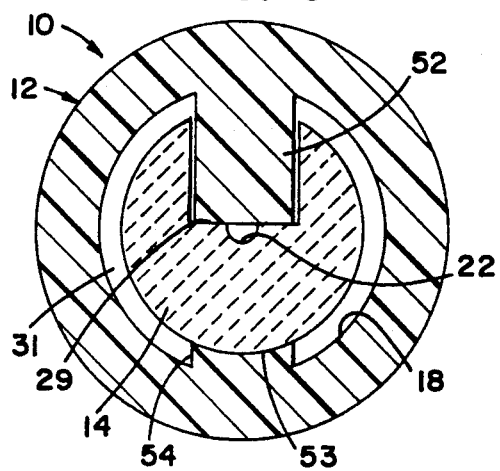
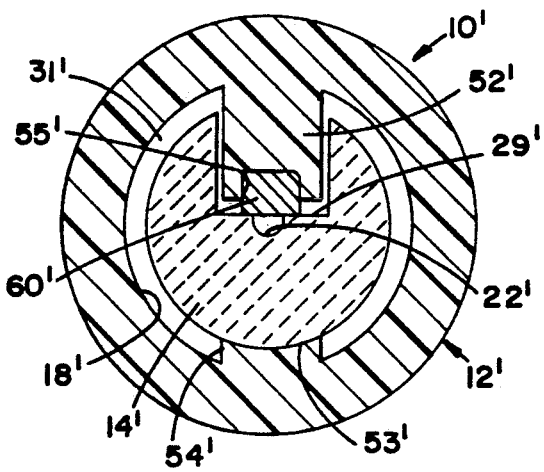
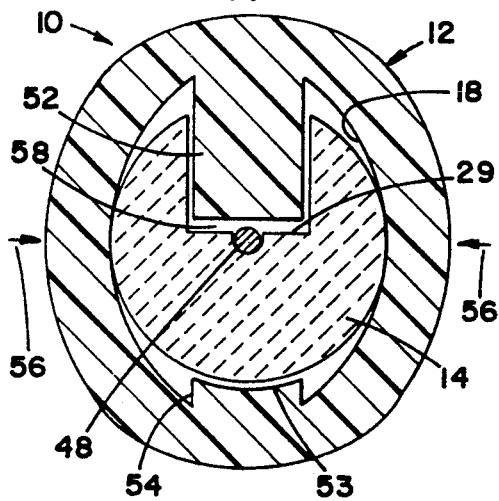
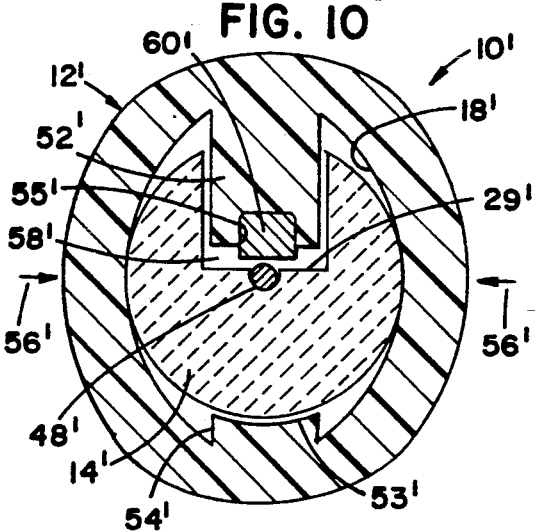
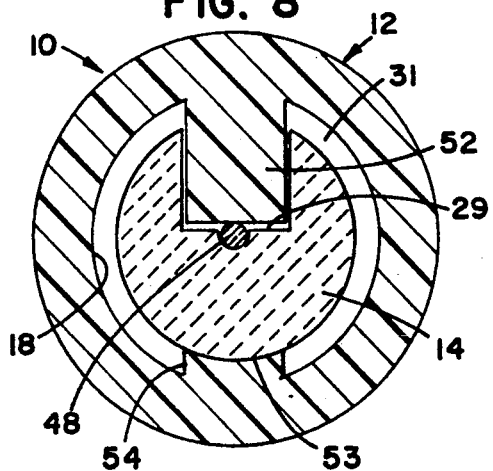
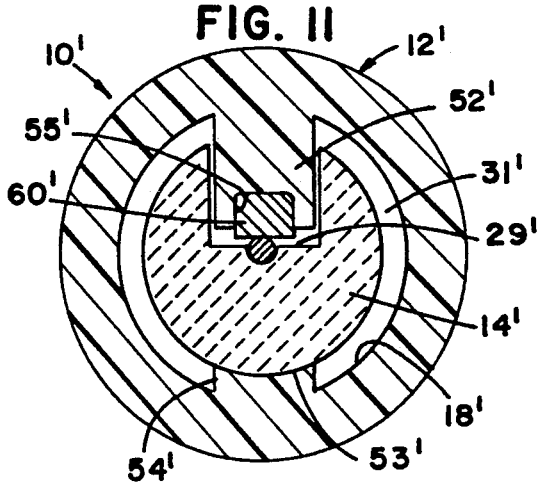

OPTICAL FIBER CRIMP

I. BACKGROUND OF THE INVENTION

1. Field of the Invention

This invention pertains to optical fiber connectors for precisely positioning and aligning a pair of optical fibers. More particularly this invention pertains to a crimp for holding an optical fiber and a ferrule.

2. Description of Related Art

The increased use of optical fibers in the telecommunication and signal transmission industries has lead to the need to develop connectors for optically connecting fiber pairs. Examples of such connectors are shown in U.S. Pat. Nos. 4,684,205; 4,422,716 and 4,850,670. Further, an improved optical fiber connector is shown in our commonly assigned copending U.S. patent application Ser. No. 07/590,000, filed Sep. 28, 1990 (still pending) and entitled, "Connector for Optical Fiber" and notwithstanding prior art developments in optical fiber connectors, there is a continuing need for improved connector designs. One of the problems encountered in the design of optical fiber connectors is the need to securely hold and retain an optical fiber in a ferrule. Also, it is desirable to provide a means for permitting easy field assembly of a connector.

It is an object of the present invention to address each of the above issues as well as others associated with optical fiber connector design.

II. SUMMARY OF THE INVENTION

According to a preferred embodiment of the present invention, an optical fiber connector subassembly is provided which includes a ferrule which receives a fiber. A longitudinally extending portion of the ferrule is removed to expose a portion of a ferrule bore. A crimp is provided for securely grasping the ferrule. The crimp includes first and second spaced apart crimping portions. The first crimping portion opposes the exposed bore portion of the ferrule. The second crimping portion opposes an opposite side of the ferrule. The crimp has a rest and a stressed state. In the stressed state, the first and second crimping portions are spaced apart a distance sufficient to freely pass a fiber into the ferrule. In the rest state, the first and second crimping portions are biased toward one another to clamp the fiber in a fixed position within the ferrule.

III. BRIEF DESCRIPTION OF THE DRAWINGS

FIG. 6 is an enlarged view similar to the view of FIG. 4 but showing the absence of a fiber within a ferrule bore and showing a crimp in a rest state;

FIG. 7 is a view of FIG. 6 showing the crimp in a stressed state;

FIG. 8 is a view of FIG. 6 showing the crimp in a rest state and showing a fiber in the ferrule bore;

FIG. 9 is a view of FIG. 6 showing an alternative embodiment with the addition of an optional spacer;

FIG. 10 is a view of FIG. 7 showing the optional spacer;

FIG. 11 is a view of FIG. 8 showing the optional spacer;

IV. DESCRIPTION OF THE PREFERRED EMBODIMENT

Figure 1:
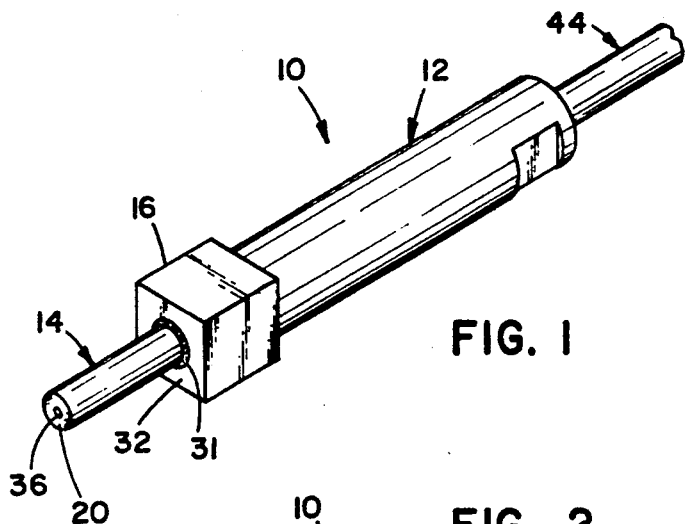
FIG. 1 is a perspective view of a crimping subassembly according to the present invention.
Figure 2:
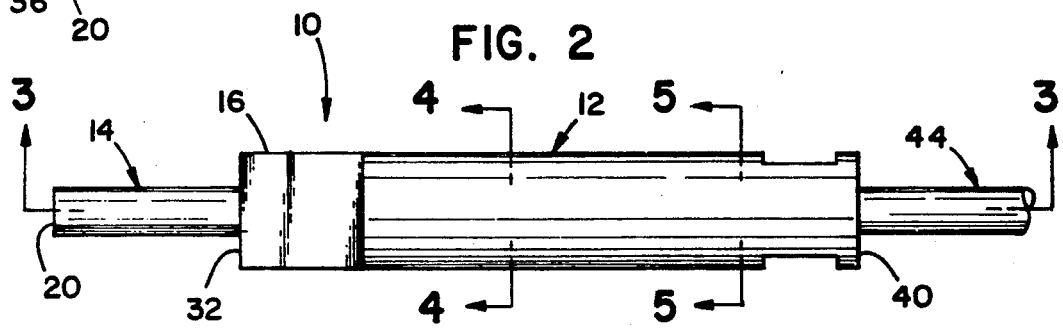
FIG. 2 is a top plane view of the subassembly of FIG. 1.

Referring now to the several drawing figures in which identical elements are numbered identically throughout, a description of the preferred embodiment of the present invention will now be provided.

With initial reference to FIGS. 1–5, a crimping subassembly 10 is shown. In a preferred use, the subassembly 10 will be employed in an optical fiber connector with the subassembly 10 holding and retaining a ferrule 14 and a fiber 48 (shown in FIG. 3).

An optical fiber connector is shown in our copending and commonly assigned application Ser. No. 07/590,000, filed Sep. 28, 1990 (still pending). In that application, a ferrule, ferrule holder, crimp are shown for holding an optical fiber. The present subassembly 10 replaces the crimp, ferrule holder and ferrule of the aforesaid patent application. Also, U.S Pat. No. 4,684,205 shows a crimp style connector where a fiber is held in a clamp (item 17 in U.S. Pat. No. 4,684,205). The fiber then passes through a ferrule (item 25 in U.S. Pat. 4,684,205) and may float freely in the ferrule. The present configuration of the present invention is believed to be an improvement on the means for holding a fiber within a ferrule.

Subassembly 10 includes a crimp body 12, and a ferrule 14. The crimp 12 is generally cylindrical except for a rectangular shaped forward end 16 to assist assembly of subassembly 10 in a full connector (not shown). The shape of forward end 16 is not material to the disclosure of the present invention.

Crimp 12 is hollow and includes a bore 18 extending axially through the crimp 12. The bore 18 is sized to receive a ferrule 14 which is preferably glass or ceramic.

Ferrule 14 is cylindrical and extends from a distal end 20 to a proximal end 21. A ferrule bore 22 (shown most clearly and labelled in FIGS. 3 and 6) extends axially through the ferrule 14.

A portion of ferrule 14 is cut away (as shown at reference numeral 26, FIG. 3) to define a longitudinally extending slot 28 which extends from proximal end 21 to a slot termination point 30 (FIG. 3) positioned between proximal end 21 and distal end 20. Point 30 is disposed within the interior of crimp 12. Accordingly, only a solid cylindrical ferrule 14 projects from the distal end 32 of crimp 12. An epoxy layer 31 (shown only in FIGS. 1, 3, 4, 6 and 8) provides initial bonding of ferrule 14 to crimp 12. The layer 31 holds the ferrule 14 in predetermined alignment with the crimp 12.

A segment 34 of an optical fiber (shown in FIG. 3) is disposed within bore 22 immediately adjacent the distal end 20 of ferrule 14. Segment 34 extends from a segment first end 36 to an internal end 38.

In a preferred embodiment, segment 34 is factory installed within ferrule 14 such that segment end 36 is polished with ferrule end 20. Also, internal fiber end 38 can be provided with an index matching treatment during manufacture for reasons that will become apparent.

The end 38 terminates within the cut away portion 26 of ferrule 14.

Figure 3:
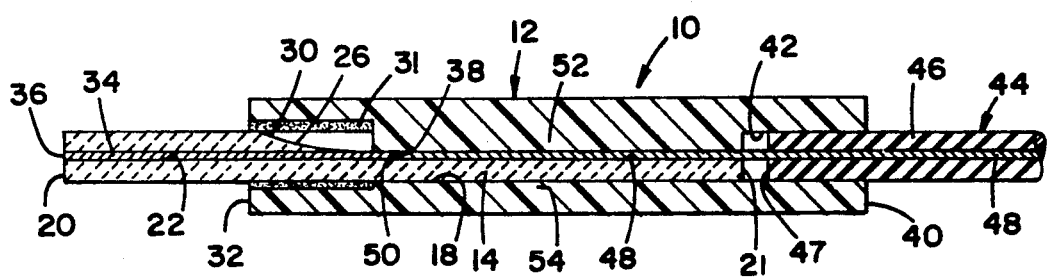
FIG. 3 is a view taken along lines 3—3 of FIG. 2.

The proximal end 40 of the crimp 12 includes a bore 42 sized to receive a sheathed optical fiber 44 which includes both a sheathing 46 and an axially positioned fiber 48. The sheathing 46 is trimmed such that the fiber 48 extends past the end 47 of the sheathing and terminates at an end 50 which abuts end 38 of segment 34 in coaxial alignment. As a result of the end-to-end abutment of fiber 48 and segment 34, fiber 48 and segment 34 are optically coupled. As shown in FIG. 3, the length of segment 34 is selected such that the position of the abutment of ends 38 and 50 occurs between crimping portions 52 and 54 (the structure and function of which will now be described).

Figure 4:
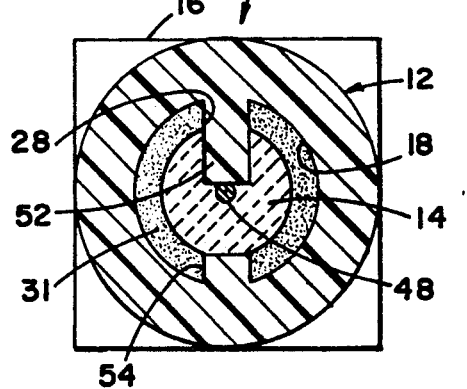
FIG. 4 is a view taken along lines 4—4 of FIG. 2.
Figure 5:
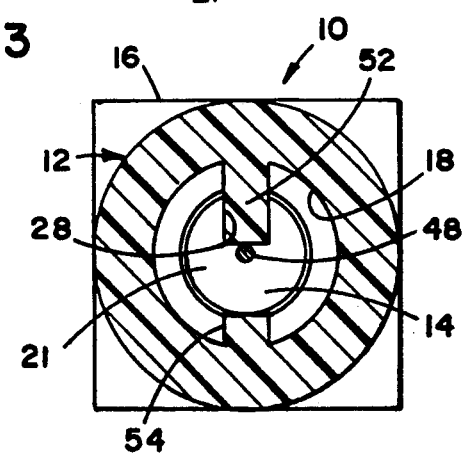
FIG. 5 is a view taken along lines 5—5 of FIG. 2.

Shown best in FIGS. 3-5, the crimp 12 includes first and second crimping portions 52,54 respectively. Each of crimping portions 52,54 is integrally formed with the cylindrical body of crimp 12 and project toward one another in diametrically opposed alignment. The crimping portions 52,54 protrude into the bore 18 and extend longitudinally within the bore 18. First crimping portion 52 is sized and positioned to oppose and be received within slot 28 and abut the base 29 (see FIG. 6) of slot 28 when no fiber is received within bore 22 (as will be described). Second crimping portion 54 is diametrically opposed to first crimping portion 52 and is sized to oppose and abut an exterior surface 53 of ferrule 14 opposite surface 29.

In a preferred embodiment, ferrule 14 is formed of glass or ceramic and crimp 12 is formed of resilient plastic. As a result, crimp 12 may be releasably deformed between a rest state and a stressed state. FIG. 6 shows the crimp 12 in a rest state with no fiber received within bore 22. As shown, first crimping portion 52 abuts surface 29 and second crimping portion 54 abuts an opposite exterior surface 53 of ferrule 14.

FIG. 7 shows the crimp 12 in a stressed state upon application of a force (indicated by arrows 56) applied to diametrically opposed exterior surfaces of crimp 12 along a line generally perpendicular to the plane defined by opposing first and second crimping portions 52,54. As a result of the squeezing action of the application of the force along line, 56, first and second crimping portions 52,54 are spaced apart to define a gap 58 (see FIG. 7) between first crimping portion 52 and surface 29. Due to the existence of the gap 58 (which together with bore 22 defines a fiber passageway which is greater than the diameter of a fiber 48), a fiber 48 may be readily inserted into bore 24. Upon release of the force indicated by arrows 56, the natural resiliency of the material of crimp 12 causes first crimping portion 52 to move toward first crimping portion 54 to thereby contact fiber 48 and firmly crimp it into the ferrule 14 (as shown in FIG. 8).

FIGS. 9, 10 and 11 show an alternate embodiment of the apparatus shown in FIGS. 6-8. In FIGS. 9-11, similar elements are numbered identically except for the addition of a prime (') to signify the difference in embodiment. As will be apparent to one skilled in the art, a description of all numbered elements in FIGS. 9-11 is not necessary and only a description of the differences will be required.

In FIGS. 9-11, the first crimping portion 52' is shown with a shorter radial length than that of first crimping portion 52. Also, first crimping portion 52' in FIGS. 9 and 10 is provided with a longitudinally extending slot 55' which opens to oppose surface 29' and bore 22'. A metallic spacer block 60' is received within slot 55'. Spacer block 60' is sized such that block 60' abuts surface 29' when the crimp 14' is in the rest state shown in FIG. 9. In the stressed state (shown in FIG. 10), the metallic spacer block 60' is spaced away from surface 29' to permit the addition of a fiber 48'. Upon removal of the force (indicated by arrows 56' in FIG. 10), the spacer block 60' abuts the fiber 48' (as shown in FIG. 11). The use of the spacer block 60' is to account for the difference in thermal expansion coefficients between the fiber 48', the ferrule 14' and the crimp 12'.

Figure 12:
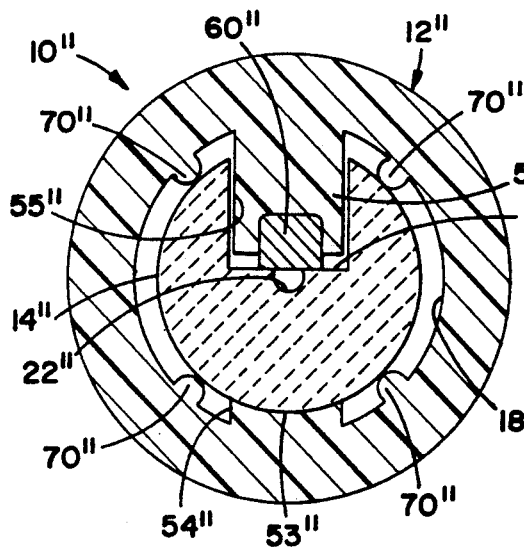
FIG. 12 is a view of FIGS. 6 and 9 showing the addition of protrusions in a second alternative embodiment.
Figure 13:
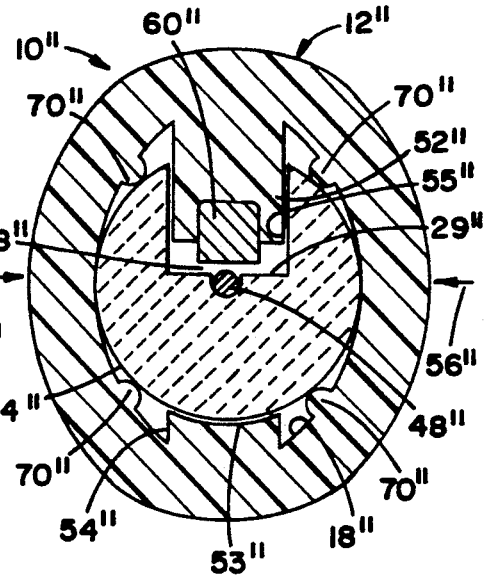
FIG. 13 is a view of the embodiment of FIG. 12 in a stressed state.
Figure 14:
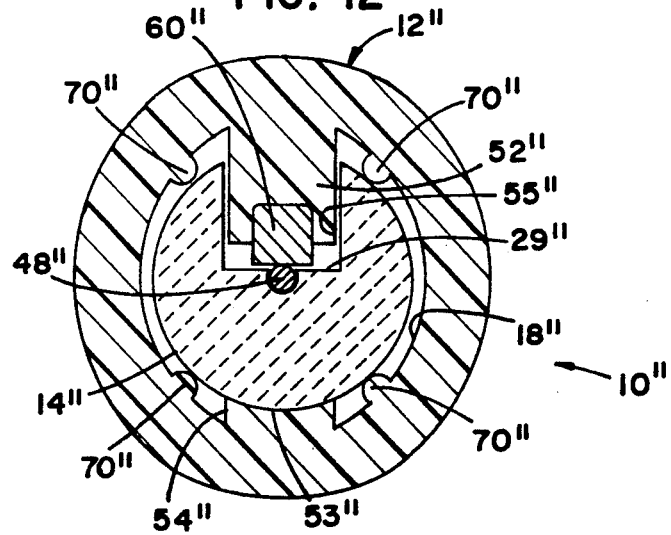
FIG. 14 is a view of the embodiment of FIG. 12 in a rest state with a fiber inserted within the ferrule.

A still further alternative embodiment is shown in FIGS. 12-14. In the embodiments of FIGS. 12-14, all reference numerals remain the same except for the addition of the double prime ("). FIGS. 12-14, protrusions 70" are provided on the interior surface of crimp 12" with the protrusions 70" extending longitudinally within bore 18". The protrusions 70" have axial dimensions such that they extend from crimp 12" to abut and contact ferrule 14". FIG. 11 shows the assembly 10" when the crimp 12" is in the rest state. FIG. 13 shows the embodiment of FIG. 12 in the stress state with a spacer block 60" spaced away from surface 29" a distance sufficient to permit unobstructed insertion of a fiber 48" into bore 22". FIG. 14 shows the embodiments of FIG. 12 upon removal of the stressing force with the spacer block 60" now abutting fiber 48" and crimping it within the ferrule 14".

The protrusions 70" are positioned such that they have a minimum movement with respect to the ferrule 14" when the force 56" is applied to the sides of the crimp 12" (as shown in FIG. 13). The protrusions secure the ferrule 14" within the crimp 12".

In addition to providing a means for securely holding a ferrule 14 and a fiber 48 within the ferrule 14, the present invention also provides for easy field assembly of a fiber 48 into a ferrule 14. Namely, the use of a factory installed fiber segment 34 (which may be epoxied or glued within ferrule 14 at a factory), permits an operator to simply insert a fiber 48 into bore 22 by simply squeezing on the sides of crimp 12. The operator then inserts the fiber 48 until it abuts end 38 at which point the squeezing force is removed with the fiber 48 securely captured within the ferrule and optically coupled to segment 34.

From the foregoing detailed description of the present invention, it has been shown how the objects of the invention have been attained in a preferred manner. However, modifications and equivalents of the disclosed concepts such as those which will readily occur to one skilled in the art are intended to be included within the scope of the claims.

What is claimed is:

1. An optical fiber crimping apparatus comprising:
    a ferrule;
    fiber receiving means for receiving an optical fiber within said ferrule;
    a crimp;
    connecting means for connecting said ferrule to said crimp in a predetermined alignment;
    said crimp including resiliently biased crimping means for crimping said fiber into said fiber receiving means, said crimp biased to a rest shape with said crimp in said rest shape disposed to engage and crimp a fiber into said fiber receiving means when said ferrule is connected to said crimp in said predetermined alignment, said crimp further including urging means for, upon application of said deforming force to said urging means, selectively urging said crimping means against said bias and out of said rest shape by an amount sufficient to insert a fiber into said fiber receiving means.

2. An optical fiber crimping apparatus comprising:
a ferrule;
fiber receiving means for receiving an optical fiber within said ferrule;
a crimp;
connecting means for connecting said ferrule to said crimp in a predetermined alignment;
said crimp including resiliently biased crimping means for crimping a fiber into said fiber receiving means, said crimping means biased to a crimping position to engage and crimp a fiber into said fiber receiving means when said ferrule is connected to said crimp in said predetermined alignment, said crimp further including urging means for selectively urging said crimping means against said bias and out of said crimping position by an amount sufficient to insert a fiber into said fiber receiving means; and
said fiber receiving means is a fiber bore formed in said ferrule and at least partially exposed;
said crimping means including at least one crimping portion carried on said crimp and disposed to oppose said partially exposed fiber bore when in said predetermined alignment, said crimping portion sized to abut and crimp a fiber retained within said bore when in said crimping position.

3. An apparatus according to claim 2 wherein said urging means comprises at least one wall of said crimp connected to said crimping means to urge said crimping means out of said crimping position upon displacement of said one wall.

4. An apparatus according to claim 2 wherein said urging means comprises opposing arcuate walls of said crimp;
said crimping means including first and second crimping portions joined by said arcuate walls with said first and second crimping portions disposed in opposing relation and spaced apart a distance sufficient for said ferrule to be inserted between said first and second crimping portion within said predetermined alignment.

5. An optical fiber crimping apparatus comprising:
a ferrule having means for receiving a fiber, said ferrule having a removed portion exposing a longitudinal surface of a fiber received within said ferrule;
a crimp having means for receiving said ferrule within said crimp, said crimp including at least a first and second crimping portion, said first crimping portion disposed to oppose said exposed longitudinal surface, said second crimping portion disposed to oppose a surface of said ferrule with said first and second crimping portions cooperating to capture said fiber and said ferrule between said first and second crimping portions;
said crimp formed from a material having a rest shape when in a rest position and releasably deformable between said rest state and a stressed state, said first and second crimping portions spaced apart in said stressed state a distance sufficient to freely pass a fiber into said ferrule, said first and second crimping portions in said rest state biased toward one another to crimp said fiber securely into said ferrule.

6. An apparatus according to claim 5 comprising an intermediate spacer between said fiber and said first crimping portion with said spacer urged by said first crimping portion to hold said fiber within said ferrule.

7. An apparatus according to claim 6 wherein said spacer member is selected to have a thermal coefficient of expansion to match a thermal expansion coefficient of said ferrule and said fiber.

8. An apparatus according to claim 5 wherein said crimp has side walls connecting said first and second crimping portions, said crimp urged to said stressed position upon application of opposing forces on said side walls, urging said side walls towards one another.

9. An apparatus according to claim 5 wherein said ferrule includes an axially extending bore with a portion of said ferrule removed to define a slot extending partially down a side of said ferrule with said slots sized to extend to and expose a portion of said bore, said first crimping portion sized to be received within said slot opposing said bore.

* * * * *